(12) United States Patent
Shan (10) Patent No.: US 12,011,740 B2
(45) Date of Patent: Jun. 18, 2024

(54) ARTICLE SORTING AND CONVEYING APPARATUS AND SORTING-CONVEYING SYSTEM

(71) Applicant: BEIJING JINGDONG QIANSHI TECHNOLOGY CO., LTD., Beijing (CN)

(72) Inventor: Wenjun Shan, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 94 days.

(21) Appl. No.: 17/782,099

(22) PCT Filed: Dec. 15, 2020

(86) PCT No.: PCT/CN2020/136453
§ 371 (c)(1),
(2) Date: Jun. 2, 2022

(87) PCT Pub. No.: WO2021/174955
PCT Pub. Date: Sep. 10, 2021

(65) Prior Publication Data
US 2023/0001453 A1 Jan. 5, 2023

(30) Foreign Application Priority Data
Mar. 6, 2020 (CN) .......................... 202010151928.5

(51) Int. Cl.
*B07C 3/08* (2006.01)
*B65G 39/20* (2006.01)

(52) U.S. Cl.
CPC ................ *B07C 3/08* (2013.01); *B65G 39/20* (2013.01)

(58) Field of Classification Search
None
See application file for complete search history.

(56) References Cited

U.S. PATENT DOCUMENTS

| 3,907,275 A | 9/1975 | Bossons |
| 9,550,626 B2 * | 1/2017 | Parodi ........................ B07C 3/08 |

(Continued)

FOREIGN PATENT DOCUMENTS

| CN | 1508054 A | 6/2004 |
| CN | 1651325 A | 8/2005 |

(Continued)

OTHER PUBLICATIONS

"First Office Action and English language translation", CN Application No. 202010151928.5, May 24, 2021, 14 pp.

(Continued)

*Primary Examiner* — Kavel Singh
(74) *Attorney, Agent, or Firm* — Myers Bigel, P.A.

(57) ABSTRACT

The present disclosure discloses are an article sorting and conveying apparatus and an article sorting and conveying system. The article sorting and conveying apparatus comprises a conveying assembly, an article carrying assembly, and a driving assembly. The conveying assembly is configured to move circularly; and the article carrying assembly comprises a conveyor belt, the conveyor belt being arranged on the conveying assembly and configured to be driven by the conveying assembly to move in a first direction. The driving assembly comprises a driving source and a driving member, the driving source being in non-contact driving connection with the driving member, the driving member being mounted to the article carrying assembly; and the driving assembly being configured to drive the conveyor belt to move in a second direction.

12 Claims, 7 Drawing Sheets

(56) References Cited

U.S. PATENT DOCUMENTS

| | | |
|---|---|---|
| 2004/0134752 A1 | 7/2004 | Miller et al. |
| 2010/0078297 A1 | 4/2010 | Andersen |
| 2015/0259146 A1 | 9/2015 | Marshall et al. |
| 2016/0052722 A1 | 2/2016 | Fujihara et al. |
| 2016/0236870 A1 | 8/2016 | Parodi et al. |
| 2017/0101268 A1* | 4/2017 | Berdelle-Hilge .... B65G 17/345 |

FOREIGN PATENT DOCUMENTS

| | | |
|---|---|---|
| CN | 1759939 A | 4/2006 |
| CN | 101837890 A | 9/2010 |
| CN | 105807772 A | 7/2016 |
| CN | 109311400 A | 2/2019 |
| CN | 110369302 A | 10/2019 |
| CN | 209597677 U | 11/2019 |
| CN | 209635286 U | 11/2019 |
| CN | 110525869 A | 12/2019 |
| CN | 110605243 A | 12/2019 |
| EP | 1362804 A1 | 11/2003 |
| WO | 0021351 A2 | 4/2000 |
| WO | 2018201845 A1 | 11/2018 |

OTHER PUBLICATIONS

"International Search Report and Written Opinion of the International Searching Authority (with English language translation of ISR)", International Application No. PCT/CN2020/136453, Mar. 17, 2021, 14 pp.

"Second Office Action and English language translation", CN Application No. 202010151928.5, Aug. 16, 2021, 7 pp.

"Communication with Supplementary European Search Report", EP Application No. 20922829.5, Feb. 22, 2024, 8 pp.

\* cited by examiner

ARTICLE SORTING AND CONVEYING APPARATUS AND SORTING-CONVEYING SYSTEM

CROSS-REFERENCE TO RELATED APPLICATIONS

This application is a U.S. National Stage Application under 35 U.S.C. § 371 of International Patent Application No. PCT/CN2020/136453, filed on Dec. 15, 2020, which is based on and claims priority to CN Application No. 202010151928.5, filed on Mar. 6, 2020, the disclosures of both of which are hereby incorporated by reference in their entireties.

FIELD OF THE INVENTION

The present disclosure relates to the field of automated logistics, and particularly to an article sorting and conveying apparatus and an article sorting and conveying system.

DESCRIPTION OF RELATED ART

A cross-belt sorter is item sorting equipment used in the field of logistics, for transporting and sorting articles. A sorting vehicle includes a conveyor belt and electric rollers. The electric rollers drive the conveyor belt to rotate so as to sort out the items from the conveyor belt, specifically to a sorting port, for example. A working person takes the items from the sorting port.

The inventors have found at least the following problems in the related art: a plurality of sorting vehicles are arranged on a conveyor belt, and each sorting vehicle is provided with electric rollers, a power source that controls motion of the electric rollers, and a communication device, which reduces the reliability of the sorting vehicles and increases the cost of the sorting vehicles.

SUMMARY OF THE INVENTION

The present disclosure provides an article sorting and conveying apparatus and an article sorting and conveying system, for optimizing the structure of the article sorting and conveying apparatus.

The article sorting and conveying apparatus provided in some embodiments of the present disclosure includes:
a conveying assembly configured to move circularly;
an article carrying assembly including a conveyor belt, the conveyor belt being arranged on the conveying assembly and configured to be driven by the conveying assembly to move in a first direction; and
a driving assembly including a driving source and a driving member, the driving source being in non-contact driving connection with the driving member, and the driving member being mounted to the article carrying assembly; and the driving assembly being configured to drive the conveyor belt to move in a second direction,
wherein the first direction and the second direction intersect each other.

In some embodiments, the driving member is arranged on each article carrying assembly; and the driving source is fixedly arranged, and one driving source is arranged correspondingly to each sorting port.

In some embodiments, the article carrying assembly further includes:
a carriage configured to be strip-like;
rollers arranged at two ends of the carriage; and
a driving belt in driving connection with the rollers and configured to drive the rollers to rotate, the driving belt being fixedly connected to the driving member,
wherein the conveyor belt is in driving connection with the rollers and is configured to be driven by the rollers.

In some embodiments, the diameter of a middle portion of each roller is smaller than the diameters of two ends of the roller, the middle portion of the roller is in driving connection with the driving belt, and the two ends of the roller are in driving connection with the conveyor belt.

In some embodiments, the middle portion of the roller is provided with first anti-slip teeth engaged with the driving belt.

In some embodiments, the two ends of the roller are provided with second anti-slip teeth engaged with the conveyor belt.

In some embodiments, the rollers include:
a first roller rotatably mounted to the carriage and in driving connection with the driving belt; and
a second roller rotatably mounted to the carriage and driven coaxially with the first roller, the diameter of the first roller being smaller than that of the second roller; and the second roller being in driving connection with the conveyor belt.

In some embodiments, the article carrying assembly further includes:
a slider, through which the driving member is fixedly connected to the driving belt,
wherein the carriage is provided with a guide slot, and the slider is mounted in the guide slot.

In some embodiments, the driving assembly includes a linear motor, the driving source includes a primary part, and the driving member includes a secondary part.

In some embodiments, the conveying assembly includes:
sprockets arranged in two groups; and
a chain in driving connection with two groups of sprockets and tensioned by the two groups of sprockets,
wherein the article carrying assembly is mounted to the chain.

In some embodiments, the article sorting and conveying apparatus further includes:
a guiding assembly configured to guide the article carrying assembly,
wherein the driving source is fixed to the guiding assembly.

In some embodiments, the article carrying assembly includes:
a guide wheel pivoted to the chain of the conveying assembly, the guiding assembly including a guide groove, the guide wheel being configured to move along the guide groove.

In some embodiments, the driving source is configured to drive the driving member to move linearly.

Some embodiments of the present disclosure further provide an article sorting and conveying system, including a sorting port and the article sorting and conveying apparatus mentioned in any technical solution of the present disclosure, the sorting port being provided with the driving source of the driving assembly.

In some embodiments, a plurality of sorting ports are provided, each of the sorting ports being provided with at least one driving source correspondingly.

The article sorting and conveying apparatus provided in the above technical solution implement conveying and sorting of items, and the sorting motion of the article carrying assembly is by the drive of the driving assembly, and on each article carrying assembly, it does not need to provide driving source but only needs to provide the driving member. The driving source is only provided at a position corresponding to the sorting port, which greatly reduces the number of driving sources needed, and simplifies the structure of the article carrying assembly, and reduces the phenomenon of unreliable performance of the article carrying assembly due to providing signal transmission devices, power sources and other components on the article carrying assembly, so that the article carrying assembly and the driving devices are all modular and convenient to arrange, and the article sorting and conveying apparatus is more reliable in performance and structure and lower in cost.

BRIEF DESCRIPTION OF THE DRAWINGS

Drawings described here are used to provide further understanding of the present disclosure and form a part of the present application. Illustrative embodiments of the present disclosure and description thereof are used for explaining the present disclosure, but do not improperly limit the present disclosure. In the drawings.

DESCRIPTION OF THE INVENTION

The technical solutions provided in the present disclosure will be described in more detail below in conjunction with FIGS. 1 to 14.

In the field of logistics sorting and conveying, article sorting and conveying apparatuses are used to convey and sort items. Item motions include two main categories: a conveying motion and a sorting motion. The conveying motion means conveying an item by a conveying assembly 1 from a position to a set position. The sorting motion means moving an item out of a conveying assembly 1 such that the item is removed from the conveying assembly 1. More specifically, sorting is also a process of removing an item from an article carrying assembly 2.

In some embodiments of the present disclosure, the conveying motion is implemented by a conveying assembly 1. The conveying assembly 1 is specifically implemented by cooperation of a sprocket 11 and a chain 12, for example. The sorting motion is implemented by an article carrying assembly 2.

Referring to FIGS. 1 to 7, some embodiments of the present disclosure provide an article sorting and conveying apparatus including a conveying assembly 1, an article carrying assembly 2, and a driving assembly 3.

The conveying assembly 1 is configured to move circularly. The conveying assembly 1 implements the conveying motion with the article carrying assembly 2 thereon.

Figure 1:
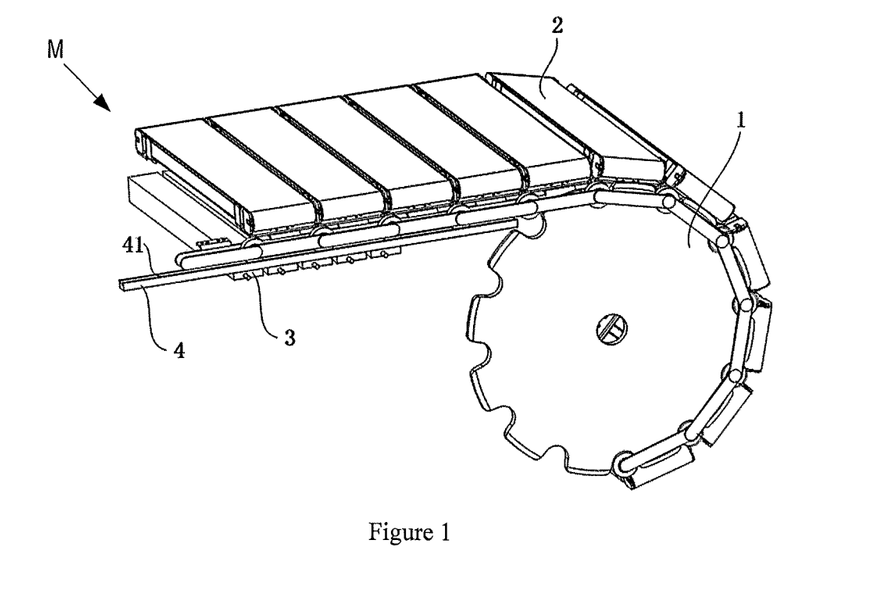
FIG. 1 is a partial stereoscopic structure diagram of an article sorting and conveying apparatus provided in some embodiments of the present disclosure.
Figure 2:
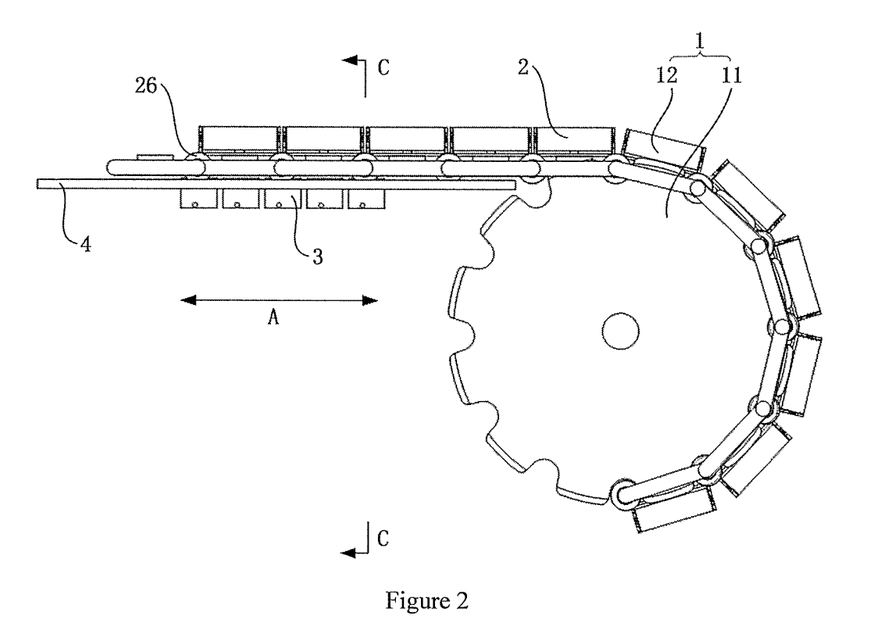
FIG. 2 is a front-view diagram of FIG. 1.

Referring to FIGS. 1 to 7, the conveying assembly 1 includes a sprocket 11 and a chain 12. Two groups of sprockets 11 are provided, and the chain 12 is wound on the two groups of sprockets 11 and is tensioned by the two groups of sprockets 11. A sprocket 11 on one side is illustrated in FIGS. 1 and 2. One of the two groups of sprockets 11 serves as a drive sprocket, and the other set serves as a driven sprocket. The drive sprocket is driven by an external force. The drive sprocket is connected to the driven sprocket through the chain 12, and the driven sprocket rotates with the rotation of the drive sprocket. Each group has one, two or more sprockets 11. To make the conveying motion of the article carrying assembly 2 smoother, the conveying assembly 1 includes a plurality of groups of sprockets 11 and chains 12. Each group of sprockets 11 and chain 12 includes one chain 12 and two sprockets 11. The sprockets 11 in the groups of sprockets 11 and chains 12 cooperate and are arranged in parallel to carry the article carrying assembly 2 together. The length directions of a plurality of groups of chains 12 are all same as the direction of the conveying motion. In some embodiments illustrated in FIGS. 1 and 2, two sprockets 11 are provided at each end of the conveying direction (i.e., a first direction A), and the two sprockets 11 are provided in parallel and are located at two ends of the length direction (i.e., a second direction B) of the article carrying assembly 2.

The external force drives the drive sprocket to rotate, and the drive sprocket causes the chain 12 to move circularly. The article carrying assembly 2 is mounted to the chain 12 and moves together with the chain 12. An item is placed on the article carrying assembly 2 and move with the rotation of the sprocket 11 to convey.

Referring to FIGS. 1 and 2, the chain 12 includes a plurality of links that are sequentially rotatably connected. Rotatable connection portions of two adjacent links are also connected to the article carrying assembly 2, specifically for example by means of pin shafts which connect the two adjacent links and the article carrying assembly 2 together. In this way, the chain 12 allows the article carrying assembly 2 to move therewith during the cyclic movement, i.e., achieving the conveying motion.

Referring to FIGS. 1 to 7, the article carrying assembly 2 includes a conveyor belt 21. The conveyor belt 21 is arranged on the conveying assembly 1, and the conveyor belt 21 is configured to be driven by the conveying assembly 1 to move in the first direction A. The first direction A is the direction of the conveying motion, referring to the direction illustrated by the arrow A in FIG. 2.

Referring to FIGS. 1 to 7, in some embodiments, the article carrying assembly 2 further includes a carriage 22, rollers 23 and a driving belt 24.

The carriage 22 is a load-bearing base for the article carrying assembly 2 and a mounting base for other components of the article carrying assembly 2. The carriage 22 is configured to be strip-like. During the sorting motion, the carriage 22 does not move; and the sorting motion is movement of the conveyor belt 21 relative to the carriage 22.

Figure 3:
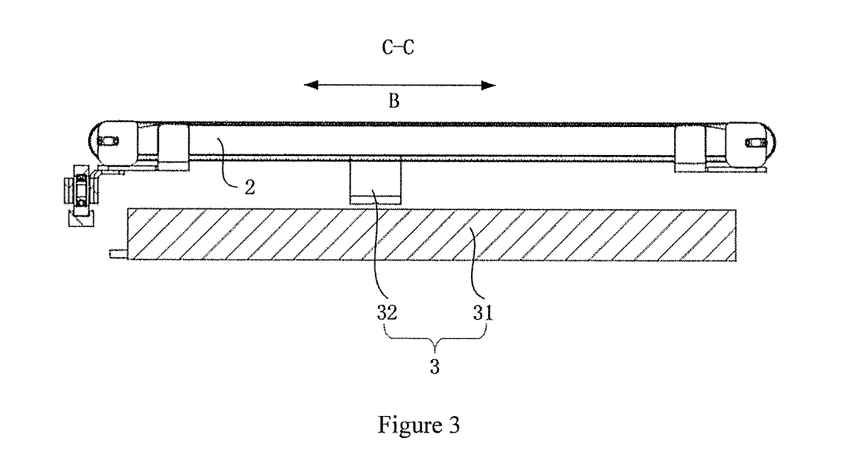
FIG. 3 is a C-C sectional diagram of FIG. 2.
Figure 4:
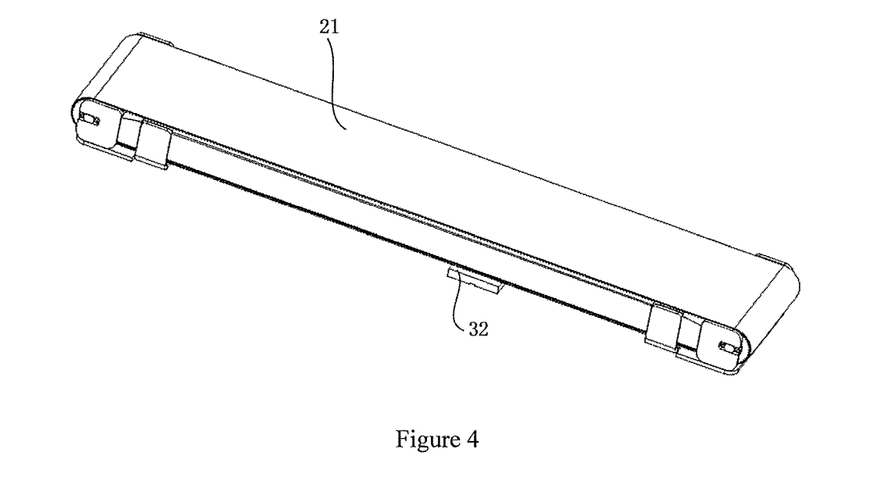
FIG. 4 is a perspective view of a article carrying assembly of the article sorting and conveying apparatus provided in the embodiments of the present disclosure.
Figure 5:
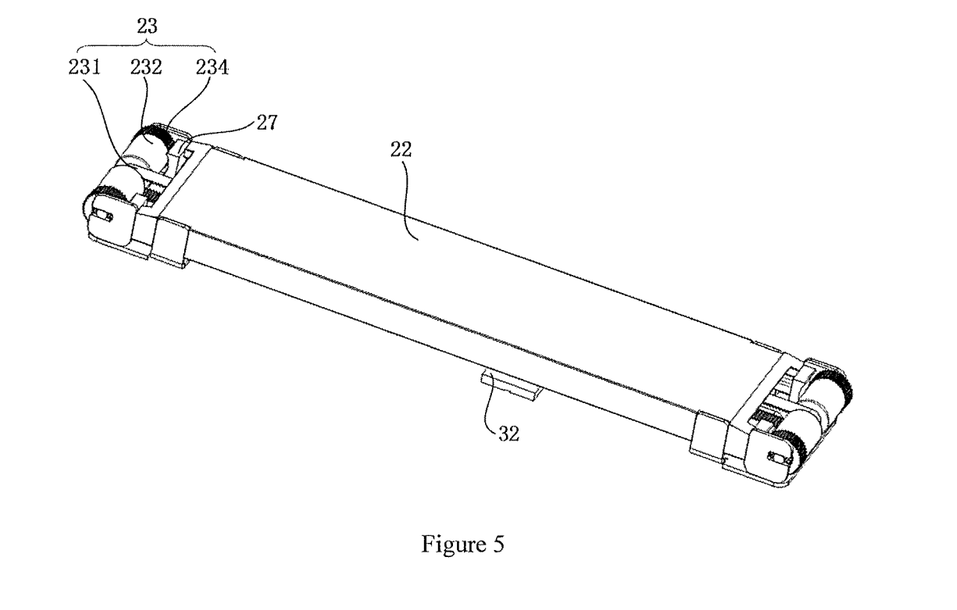
FIG. 5 is a perspective view of other parts of the article carrying assembly of the article sorting and conveying apparatus provided in the embodiments of the present disclosure after a conveyor belt is removed.
Figure 6:
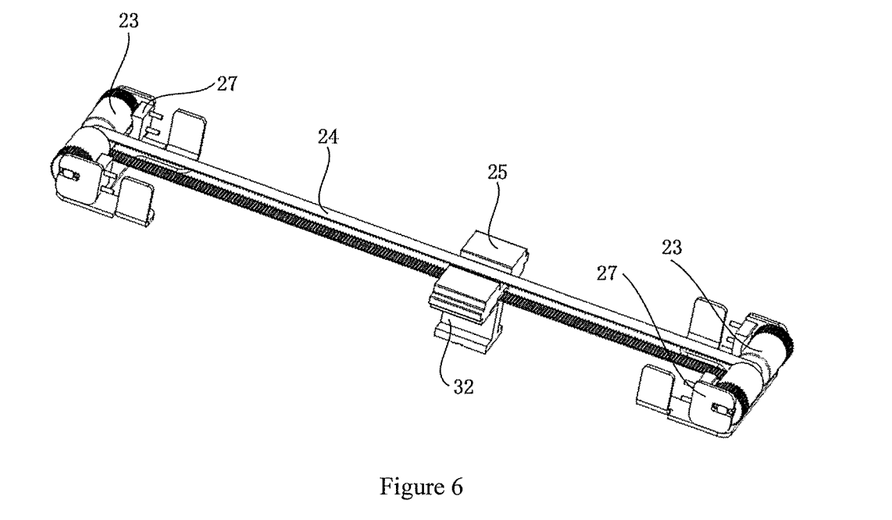
FIG. 6 is a perspective view of other parts of the article carrying assembly of the article sorting and conveying apparatus provided in the embodiments of the present disclosure after the conveyor belt and the carriage are removed.
Figure 7:
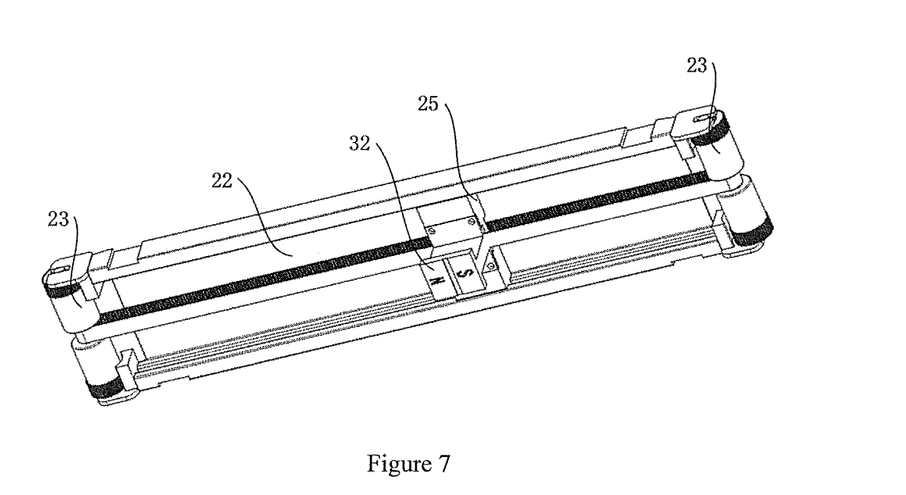
FIG. 7 is another perspective view of the article carrying assembly of the article sorting and conveying apparatus provided in the embodiments of the present disclosure.
Figure 8:
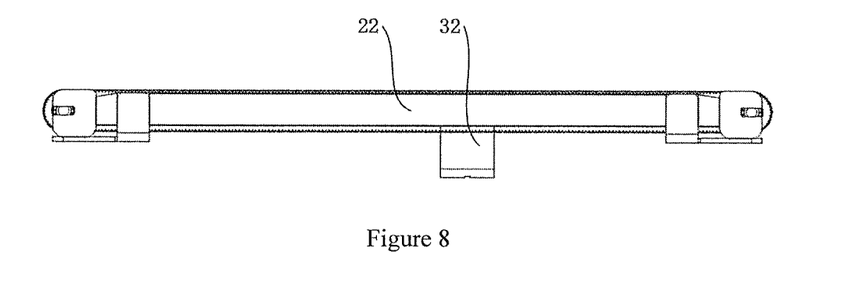
FIG. 8 is a front-view diagram of the article carrying assembly of the article sorting and conveying apparatus provided in the embodiments of the present disclosure.
Figure 9:
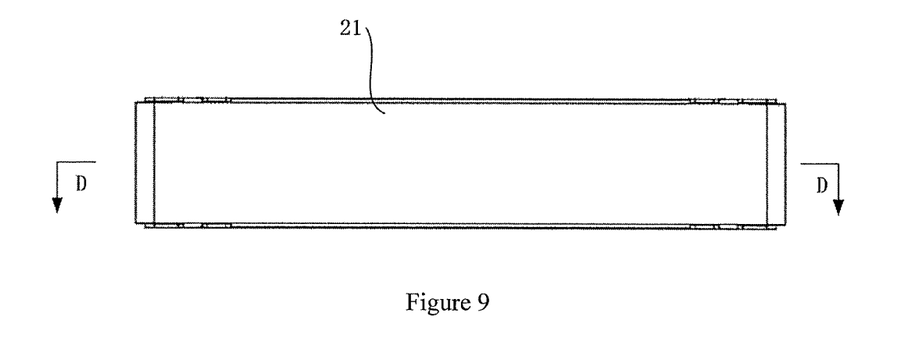
FIG. 9 is a top-view diagram of the article carrying assembly of the article sorting and conveying apparatus provided in the embodiments of the present disclosure.
Figure 10:
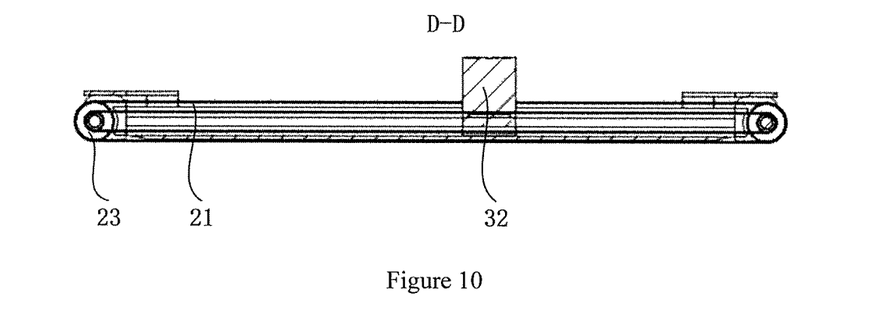
FIG. 10 is a D-D sectional diagram of FIG. 9.
Figure 11:
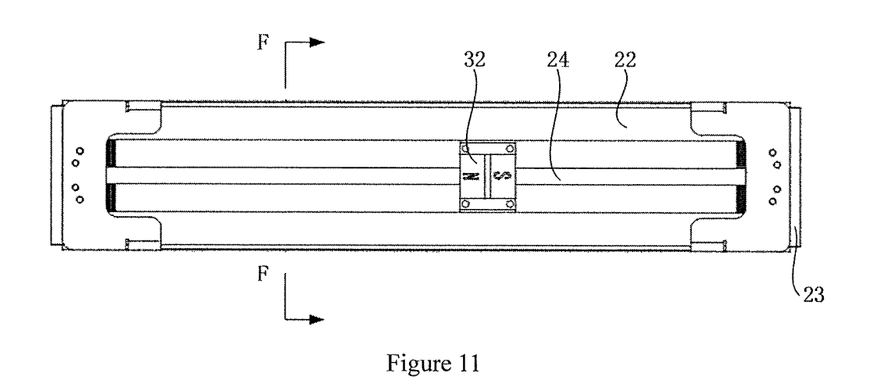
FIG. 11 is a bottom-view diagram of the article carrying assembly of the article sorting and conveying apparatus provided in the embodiments of the present disclosure.
Figure 12:
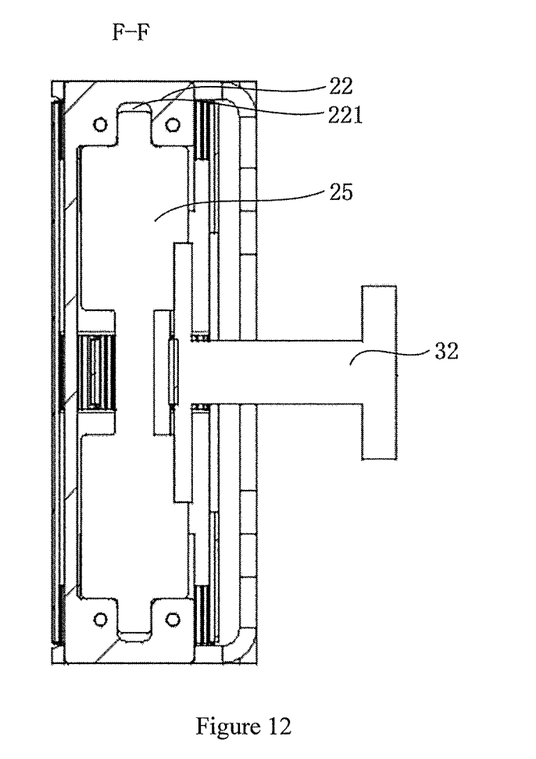
FIG. 12 is an F-F sectional diagram of FIG. 11.
Figure 13:
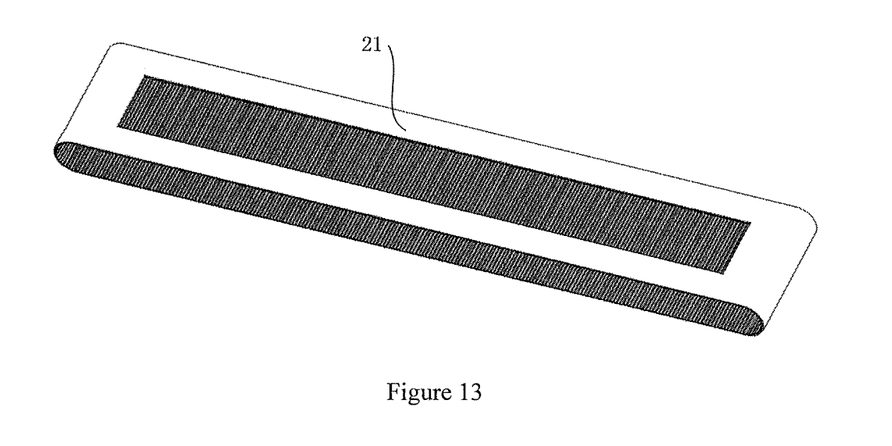
FIG. 13 is a structure diagram of the article carrying assembly of the article sorting and conveying apparatus provided in the embodiments of the present disclosure.

In some embodiments, the carriage 22 is configured to be strip-like; and rollers 23 are arranged at two ends 232 of the carriage 22. The carriage 22 functions to support and carry the rollers 23. The length direction of the carriage 22 is the second direction B, as shown in FIG. 3. The rollers 23 are provided at each end of the length direction of the carriage 22. The rollers 23 are rotatably mounted to the carriage 22. Specifically, the rollers 23 are rotatably mounted to roller mounting seats 27, and the roller mounting seats 27 are fixed to the carriage 22, as shown in FIGS. 5 to 7.

Referring to FIGS. 4 to 7, the rollers 23 are used to mount the conveyor belt 21, and drives the conveyor belt 21 to move. Specifically, the driving assembly 3 drives the rollers 23 to move, and the rollers 23, by friction, bring the sprockets conveyor belt 21 into motion.

The motive force of the rollers 23 is from the drive of the driving assembly 3. Specifically, the driving assembly 3 drives the driving belt 24 to rotate so that the item located on the conveyor belt 21 is moved to an edge of the conveyor belt 21 and falls under the action of gravity and inertia.

Referring to FIGS. 1 to 7, the driving belt 24 is in driving connection with the rollers 23, and the driving belt 24 drives the rollers 23 to rotate. The driving belt 24 is fixedly connected to the driving member 32. The conveyor belt 21 is in driving connection with the rollers 23 and is driven by the rollers 23. In an initial state, the driving member 32 is located, for example, in the middle of the length direction of the carriage 22.

Referring to FIGS. 1 to 7 and FIG. 14, it can be seen from the above structures that two belts are wound on the rollers 23 located at the two ends of the carriage 22: the driving belt 24 and the conveyor belt 21. The driving belt 24 receives a drive force from the driving assembly 3, and then transfers the drive force to the conveyor belt 21 through an intermediate transfer component. A specific transmission process of the motive force is as follows. A driving source 31 of the driving assembly 3 drives the driving member 32 to move linearly, which driving member 32 is fixed together with the driving belt 24. The driving belt 24 is in driving connection with the rollers 23. The movement of the driving belt 24 causes the rollers 23 to rotate, and the rotation of the rollers 23 causes the conveyor belt 21 to rotate. The item is placed on the conveyor belt 21, and the movement of the conveyor belt 21 causes the item to move from a middle portion of the conveyor belt 21 to the edge of the conveyor belt 21, and then the item falls under the action of inertial force and gravity.

Referring to FIGS. 5 to 7 and FIG. 14, in some embodiments, the diameter of a middle portion 231 of each roller 23 is smaller than the diameters of two ends 232 of the roller 23, the middle portion 231 of the roller 23 is in driving connection with the driving belt 24, and the two ends 232 of the roller 23 are in driving connection with the conveyor belt 21.

As the diameter of the middle portion 231 of the roller 23 is smaller, the middle portion 231 of the roller 23 is in driving connection with the driving belt 24. As the diameters of the two ends 232 of the roller 23 are larger, the two ends 232 of the roller 23 are in driving connection with the conveyor belt 21. The conveyor belt 21 is located on the outer sides and close to edges, and the driving belt 24 is located on the inner side and close to the middle. This arrangement can achieve that when the driving belt 24 travels a distance S, the conveyor belt 21 travels a distance that is n times S. The value of n is greater than 1. In some embodiments, their corresponding ratio is such that, for example, when the driving belt 24 travels a distance S, the conveyor belt 21 travels a distance that is less than 2S and greater than S, such that the item at an edge of the conveyor belt 21 can also be moved to an edge of another side and unloaded therefrom.

Figure 14:
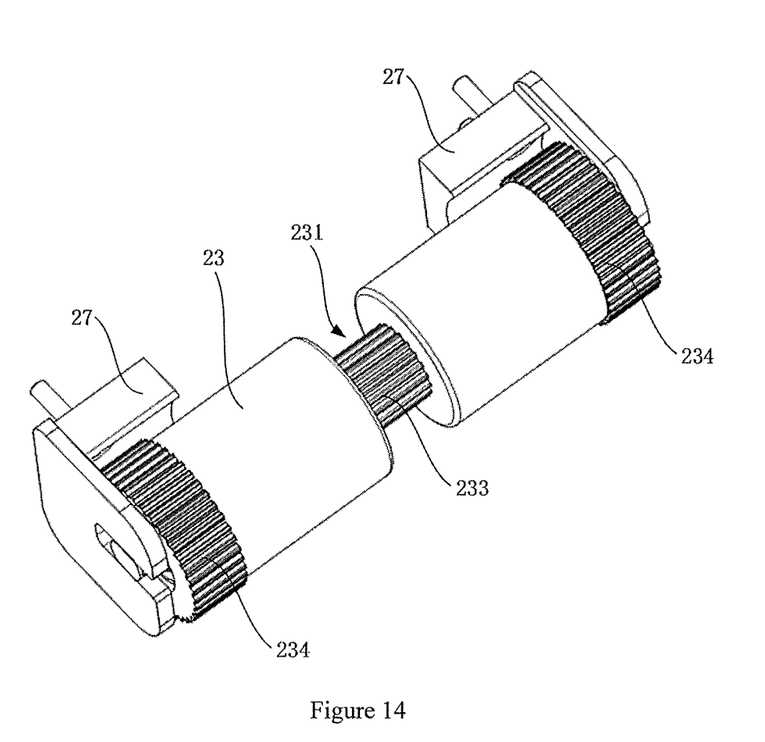
FIG. 14 is a diagram of a roller mounting structure at one end of the carriage of the article carrying assembly of the article sorting and conveying apparatus provided in the embodiments of the present disclosure.

Referring to FIGS. 1 and 14, in some embodiments, the middle portion 231 of the roller 23 is provided with first anti-slip teeth 233 cooperating with the driving belt 24. The first anti-slip teeth 233 are tooth-like structures arranged in a circle.

Referring to FIGS. 1 and 14, in some embodiments, at least one of the two ends 232 of the roller 23 is provided with second anti-slip teeth 234 engaged with the conveyor belt 21. The second anti-slip teeth 234 are tooth-like structures arranged in a circle. In some embodiments, each of the two ends 232 of the roller 23 is provided with a circle of second anti-slip teeth 234.

Referring to FIGS. 7 to 12, in some embodiments, the article carrying assembly 2 further includes a slider 25. The driving member 32 is fixedly connected to the driving belt 24 through the slider 25, and the driving member 32 is bonded, welded or threaded connected to the slider 25. The carriage 22 is provided with a guide slot 221, which extends in the same direction as the second direction B, and the slider 25 is mounted in the guide slot 221. Providing the slider 25 can make the linear movement of the driving member 32 smoother, such that the rotation of the driving belt 24 driven by the driving member 32 is also smoother and more reliable, and the rotation of the rollers 23 is also smoother, so the movement of the conveyor belt 21 driven by the rollers 23 is also smoother and less prone to wobble.

Referring to FIGS. 1 and 2, in some embodiments, to make the conveying motion of the conveyor belt 2 smoother, the article sorting and conveying apparatus is further provided with a guiding assembly 4. The guiding assembly 4 is fixedly arranged, for example, on the floor of a factory building or other fixed equipment. The guiding assembly 4 is configured to guide the conveying motion of the article carrying assembly 2. The driving source 31 is fixed to the guiding assembly 4.

Referring to FIGS. 1 and 2, the article carrying assembly 2 includes a guide wheel 26. The guide wheel 26 is pivoted to the chain 12 of the conveying assembly 1.

The guiding assembly 4 includes a guide groove 41, and the guide wheel 26 is configured to move along the guide groove 41.

Referring to FIGS. 1 and 2, in some embodiments, the guide wheel 26 is mounted to the bottom of the carriage 22. An axle of the guide wheel 26 is pivoted to two adjacent links described above.

Referring to FIGS. 1 and 2, two guiding assemblies 4 are provided, and one or more guide wheels 26 are provided on each side of the bottom of the carriage 22 of the article carrying assembly 2. The guide groove 41 extends in the same direction as the first direction, and the guide wheel 26 moves along the guide groove 41 of the guiding assembly 4.

Other implementations of the roller 23 are described below.

In other embodiments, the roller 23 located at each end of the carriage 22 is not an integral whole, but includes a plurality of independent rollers 23. Specifically, the roller 23 located at each end of the carriage 22 includes a first roller and a second roller. The first roller is rotatably mounted to the carriage 22 and in driving connection with the driving belt 24. The second roller is rotatably mounted to the carriage 22 and driven coaxially with the first roller; the diameter of the first roller is smaller than that of the second roller; and the second roller is in driving connection with the conveyor belt 21.

In other embodiments, the first roller is in driving cooperation with the driving belt 24, and the second roller is in driving cooperation with the conveyor belt 21. The first roller and the second roller located at the same end of the carriage 22 are mounted to the same rotating shaft, i.e., rotation center lines of the first roller and the second roller are coaxial. A transmission path of the motive force is as follows. The driving source 31 drives the driving member 32 to move linearly, and the driving belt 24 fixedly connected with the driving member 32 is brought into motion, thereby causing the first roller to rotate. The first roller causes the second roller coaxial therewith to rotate through the rotating shaft. The rotation of the second roller brings the conveyor belt 21 into motion. It is to be noted that due to the relatively short path of movement required for the sorting motion, the conveyor belt 21 does not move circularly in a 360-degree range, but rather just moves to the extent that the item located on the conveyor belt 21 is moved from any position on the conveyor belt 21 to an edge of the conveyor belt 21 where a sorting port M for required sorting is located. Different rollers 23 cooperate with the driving belt 24 and the conveyor belt 21 respectively, which facilitates processing and manufacturing.

How to implement the sorting motion is introduced below.

The sorting motion is implemented in such a manner that the driving assembly 3 drives the conveyor belt 21 to move. The sorting motion is independent from the conveying motion. In other words, the conveying motion of the conveyor belt 21 is implemented in such a manner that the conveying assembly 1 brings the entire article carrying assembly 2 into motion, and the sorting motion is movement of the conveyor belt 21 relative to the conveying assembly 1. The sorting motion of the article carrying assembly 21 exists regardless of whether the conveying assembly 1 moves.

The driving assembly 3 includes the driving source 31 and the driving member 32. The driving source 31 does not move with the conveying motion nor with the sorting motion. The driving source 31 is fixed at a position corresponding to the sorting port M. The driving source 31 is in non-contact driving connection with the driving member 32. The driving member 32 is mounted to the article carrying assembly 2; and the driving assembly 3 is configured to drive the conveyor belt 21 to move in a second direction, which is the direction of the sorting motion. The first direction and the second direction intersect each other, such as being perpendicular to each other.

The driving source 31 and the driving member 32 are not in contact and are separated by a certain distance, i.e., there is a gap between the driving source 31 and the driving member 32. Only the driving member 32 need to be arranged on the article carrying assembly 2, and no control components such as power supply and signal transmission components need to be arranged on the article carrying assembly 2. This greatly reduces the structural complexity of the article carrying assembly 2 and also improves the reliability of the article carrying assembly 2.

In practical applications, the position of the sorting port M is basically determined, and the driving source 31 is installed at the position corresponding to the sorting port M, and the driving source 31 is common. In some embodiments described above, the article sorting and conveying apparatus further includes the guiding assembly 4 for guiding the article carrying assembly 2, and the driving source 31 is fixed to the guiding assembly 4. For example, the entire article sorting and conveying apparatus includes four sorting ports M1, M2, M3 and M4. One driving source 31 is provided at each of the four sorting ports M1, M2, M3 and M4. All article carrying assemblies 2 are only provided with the driving members 32. When the item needs to be sorted out of the sorting port M1, the driving source 31 at the sorting port M1 is started. When the article carrying assembly 2 is transported to the sorting port M1, the driving source 31 drives the conveyor belt 21 of the article carrying assembly 2 to move to drop the item off the conveyor belt 21 into the corresponding sorting port.

In the above technical solution, as the driving source 31 of each sorting port is common, there is no need to provide both the driving source 31 and the drive part 32 on the article carrying assembly 2, which greatly reduces the number of driving sources 31 needed on the one hand, and achieves that the entire article sorting and conveying apparatus is more compact and needs fewer components to achieve the same performance on the other hand, thus optimizing the structure of the article sorting and conveying apparatus.

In some embodiments, the driving assembly 3 includes a linear motor. The driving source 31 includes a primary part, and the driving member 32 includes a secondary part. The primary part and the guiding assembly 4 are mounted together, and both are fixed and motionless. The secondary part moves with the conveying motion of the article carrying assembly 2. When the secondary part moves to a position where it can be driven by the primary part, the primary part drives the secondary part to move linearly, and then the movement of the secondary part is converted into movement of the conveyor belt 21 by the components of the article carrying assembly 2 described above.

Specifically, the article carrying assembly 2 is provided with a slidable secondary part at the bottom, and the belt of the article carrying assembly 2 is fixedly connected to the secondary part. When the secondary part is excited by the linear motor, it moves either left or right depending on the direction of excitation, thereby causing the conveyor belt 21 to rotate and throw the item on the article carrying assembly 2 into the port. As the article carrying assemblies 2 passes through the sorting port in sequence, one driving source 31 provided at the sorting port drives all driving members 32 that pass through the sorting port, which reduces the number of driving sources 31 needed and allows the article sorting and conveying apparatus to have a more reasonable and compact structure and more optimized performance.

Some embodiments of the present disclosure further provide an article sorting and conveying system, including a sorting port and the article sorting and conveying apparatus provided in any technical solution of the present disclosure, the sorting port corresponding to the driving source 31 of the driving assembly 3.

In some embodiments, a plurality of sorting ports are provided, each of the sorting ports being provided with at least one driving source 31 correspondingly.

The article sorting and conveying system provided in the above technical solution has the structure and features of the article sorting and conveying apparatus described above, which will not be repeated here.

In description of the present disclosure, it needs to be appreciated that orientation or position relations denoted by the terms "center", "longitudinal", "transverse", "front", "rear", "left", "right", "vertical", "horizontal", "top", "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be construed as limiting the protection scope of the present disclosure.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the scope of the technical solutions sought for protection in the present disclosure so long as they do not depart from the spirit of the technical solutions of the present disclosure.

The invention claimed is:

1. An article sorting and conveying apparatus, comprising:
    a conveying assembly configured to move circularly;
    an article carrying assembly comprising a conveyor belt, the conveyor belt being arranged on the conveying assembly and configured to be driven by the conveying assembly to move in a first direction; and
    a driving assembly comprising a driving source and a driving member, the driving source being in non-contact driving connection with the driving member, and the driving member being mounted to the article carrying assembly; and the driving assembly being configured to drive the conveyor belt to move in a second direction,
    wherein the first direction and the second direction intersect each other;
    wherein the article carrying assembly further comprises:
        a carriage configured to be strip-like;
        rollers arranged at two ends of the carriage; and
        a driving belt in driving connection with the rollers and configured to drive the rollers to rotate, the driving belt being fixedly connected to the driving member,
    wherein the conveyor belt is in driving connection with the rollers and is configured to be driven by the rollers;
    wherein a diameter of a middle portion of each roller is smaller than respective diameters of two ends of the roller, the middle portion of the roller is in driving connection with the driving belt, and the two ends of the roller are in driving connection with the conveyor belt; or
    wherein the rollers comprise:
        a first roller rotatably mounted to the carriage and in driving connection with the driving belt; and
        a second roller rotatably mounted to the carriage and driven coaxially with the first roller, a diameter of the first roller being smaller than that of the second roller; and the second roller being in driving connection with the conveyor belt.

2. The article sorting and conveying apparatus according to claim 1, wherein the driving member is arranged on each article carrying assembly; and the driving source is fixedly arranged, and one driving source is arranged correspondingly to each sorting port.

3. The article sorting and conveying apparatus according to claim 1, wherein the middle portion of the roller is provided with first anti-slip teeth engaged with the driving belt.

4. The article sorting and conveying apparatus according to claim 1, wherein the two ends of the roller are provided with second anti-slip teeth engaged with the conveyor belt.

5. The article sorting and conveying apparatus according to claim 1, wherein the article carrying assembly further comprises:
    a slider, through which the driving member is fixedly connected to the driving belt,
    wherein the carriage is provided with a guide slot, and the slider is mounted in the guide slot.

6. The article sorting and conveying apparatus according to claim 1, wherein the driving assembly comprises a linear motor, the driving source comprises a primary part, and the driving member comprises a secondary part.

7. The article sorting and conveying apparatus according to claim 1, wherein the conveying assembly comprises:
    sprockets arranged in two groups dispersedly; and
    a chain in driving connection with the sprockets and tensioned by the two groups of sprockets,
    wherein the article carrying assembly is mounted to the chain.

8. The article sorting and conveying apparatus according to claim 7, further comprising:
    a guiding assembly fixedly arranged and configured to guide the article carrying assembly,
    wherein the driving source is fixed to the guiding assembly.

9. The article sorting and conveying apparatus according to claim 8, wherein the article carrying assembly comprises:
    a guide wheel pivoted to the chain of the conveying assembly, the guiding assembly comprising a guide groove, the guide wheel being configured to move along the guide groove.

10. The article sorting and conveying apparatus according to claim 1, wherein the driving source is configured to drive the driving member to move linearly.

11. A sorting-conveying system, comprising a sorting port and the article sorting and conveying apparatus of claim 1, the sorting port corresponding to the driving source of the driving assembly.

12. The sorting-conveying system according to claim 11, wherein a plurality of sorting ports are provided, each of the sorting ports being provided with at least one driving source correspondingly.

* * * * *